United States Patent [19]

Murakawa et al.

[11] Patent Number: 4,945,716
[45] Date of Patent: Aug. 7, 1990

[54] LAWN MOWER

[75] Inventors: Masatake Murakawa; Mikio Yuki, both of Osaka, Japan

[73] Assignee: Kubota Ltd., Osaka, Japan

[21] Appl. No.: 412,360

[22] Filed: Sep. 25, 1989

[30] Foreign Application Priority Data

Feb. 14, 1989 [JP] Japan ............................ 1-16100[U]
Feb. 16, 1989 [JP] Japan ............................ 1-38029
Mar. 23, 1989 [JP] Japan ............................ 1-33354[U]

[51] Int. Cl.$^5$ .......................................... A01D 34/03
[52] U.S. Cl. ................................................ 56/13.3
[58] Field of Search ................. 56/12.8, 13.3, 13.4, 56/10.1, 16.7

[56] References Cited

U.S. PATENT DOCUMENTS

| | | | |
|---|---|---|---|
| 4,095,398 | 6/1978 | Aumann et al. | 56/13.4 X |
| 4,106,272 | 8/1978 | Peterson et al. | 56/13.4 X |
| 4,263,772 | 4/1981 | Phillips et al. | 56/13.3 X |
| 4,693,063 | 9/1987 | Hoepfner et al. | 56/13.3 X |
| 4,711,073 | 12/1987 | Freier, Jr. et al. | 56/13.3 |

FOREIGN PATENT DOCUMENTS 62-130424  8/1987  Japan .

Primary Examiner—Thuy M. Bui
Attorney, Agent, or Firm—Jordan and Hamburg

[57] ABSTRACT

A lawn mower comprising a mower unit including a mower housing defining a grass clipping side discharge opening, and a blower connected to the mower housing for communication with the discharge opening. The mower housing contains rotary cutting blades driven by a vertical drive shaft. The blower includes a blower case, a blower shaft extending substantially horizontally through the blower case toward the mower housing, and a blower fan mounted on the blower shaft inside the blower case. The blower shaft is operative connected through a shaft transmission device provided on the mower housing to a PTO shaft which receives power from the drive shaft through a bevel gear pair.

7 Claims, 6 Drawing Sheets ically movably mounted centrally of and underneath the
LAWN MOWER

BACKGROUND OF THE INVENTION (1) Field of the Invention

The present invention relates to a garden tractor or riding lawn mower having a blower unit connected to a discharge opening defined in one lateral side of a mower or grass cutting unit for transmitting grass clippings to a grass catcher.

(2) Description of the Prior Art

One of the Inventors has made a proposal for facilitating detachment of the blower unit as disclosed in Japanese utility model application No. 63-140478. In this construction, the bower unit has a drive input section thereof disposed adjaoent the mower unit. Drive is transmitted to the drive input section through a transmission mechanism including a flexible wire and a spring.

The proposed construction facilitates detachment of the blower unit since the blower unit has a rotary shaft connected to the flexible wire at a position adjacent a gear case provided on a top surface of a mower housing. However, the flexible wire which extends in a curved way tends to have its rotating inner cable and outer wire in constant, intense contact with each other. The prior construction thus leaves room for improvement in the durability of the transmission mechanism using the rotating cable.

SUMMARY OF THE INVENTION

An object of the present invention is to provide a lawn mower including a highly durable transmission while facilitating attachment and detachment of the blower unit.

The above object is achieved, according to the present invention, by a lawn mower comprising a mower unit including a mower housing defining a grass clipping side discharge opening, and at least one cutting blade rotatable on a substantially vertical drive shaft inside the mower housing, a blower unit mounted laterally of the mower housing, the blower unit including a blower case defining a chamber communicating with the side discharge opening, a blower shaft extending substantially horizontally in the blower case, a blower shaft extension extending through the blower case toward the mower housing, and a blower fan mounted on the blower shaft, and shaft transmission means connected at one end thereof to the blower shaft extension and extending substantially horizontally above the mower housing, the shaft transmission means including a PTO shaft for receiving power from the drive shaft through bevel gear means.

With the above lawn mower, the blower unit is shaft-driven by power input to the mower housing. The blower unit, driven through the shafts, is attachable and detachable with ease.

Since the blower unit is driven through the shaft transmission means, there is no constant contact between the rotating element and stationary element occurring where a flexible wire is used. The improved blower drive mechanism according to the present invention is thus highly durable and reliable with a minimal transmission loss as distinct from the cable drive.

In a preferred embodiment of the invention, the mower case is formed of an inner lateral wall defining a connecting opening for communication with the discharge opening of the mower unit, an outer lateral wall, and a peripheral wall connected to the inner and outer lateral walls and extending circumferentially of the blower fan, the inner lateral wall including a bulging portion bugling in a truncated cone shape about an axis of the blower shaft extension.

The bulging portion of the blower case bulging in a truncated cone shape enlarges its capacity and the area of the inner lateral wall of the blower case. Although the blower unit includes an input section for driving the blower fan, which has a detrimental effect on the flow of grass clippings drawn from the mower unit to the blower fan, the input section can be disposed at the inner lateral wall of the blower case without deteriorating the efficiency of grass clipping conveyance.

Since the bulging portion is in the form of a truncated cone having the axis of the blower fan as its center, the grass clippings are drawn to the blower fan with increased efficiency. Consequently, although the input section is disposed in the bulging portion, the grass clipping conveying efficiency within the blower unit may be higher than in the prior art.

The foregoing and other objects, features and advantages of the invention will be apparent from the following more particular description of a preferred embodiment of the invention, as illustrated in the accompanying drawings.

BRIEF DESCRIPTION OF THE DRAWINGS

The drawings show a lawn mower according to the present invention, in which.

DESCRIPTION OF THE PREFERRED EMBODIMENT

An embodiment of the invention will be described hereinafter with reference to the drawings.

Figure 1:
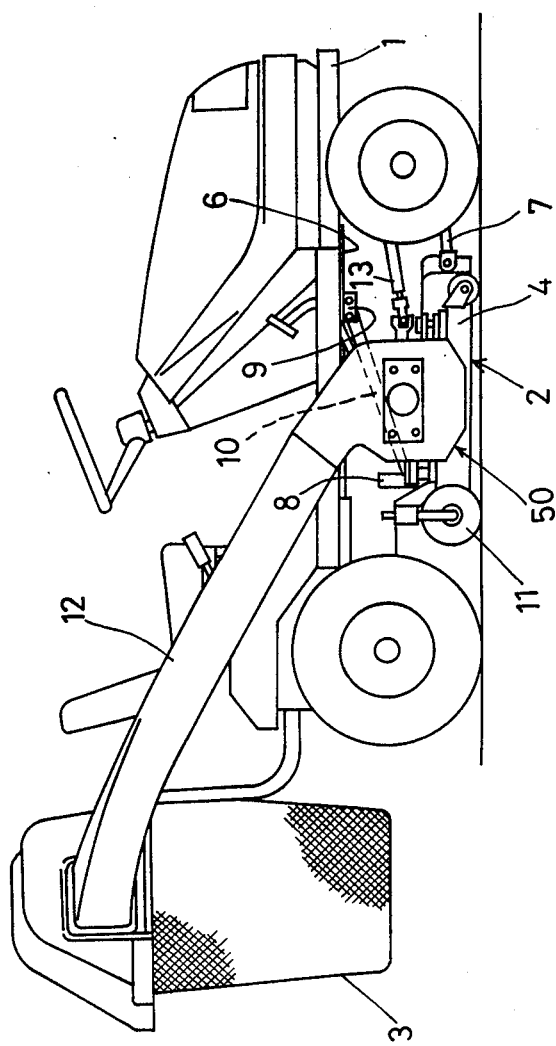
FIG. 1 is a side elevation of the lawn mower.

FIG. 1 shows a garden tractor or riding lawn mower according to the invention. This tractor comprises a tractor body 1, a mower or grass cutting unit 2 vertically movably mounted centrally of and underneath the tractor body 1, and a grass catcher 3 disposed rearwardly to collect grass clippings transmitted from the mower unit 2.

The mower unit 2 includes a housing 4 acting as a frame and accommodating rotary blades 5. The housing 4 is pivotally connected at a forward end thereof to forward positions of a vehicle frame 6 through a pair of right and left front links 7. The housing 4 carries a connecting bracket g erected on an upper rear surface thereof and connected to a bracket 9 fixed to an intermediate position on an undersurface of the vehicle frame 6 through a pair of right and left rear links 10. The front and rear links 7 and 10 constitute a parallelogram link mechanism for vertically moving the mower unit 2 in a horizontal posture relative to the tractor body 1. The mower unit 2 further includes a gage wheel 11 connected to a rear position of the housing 4 for providing support relative to the ground.

Figure 2:
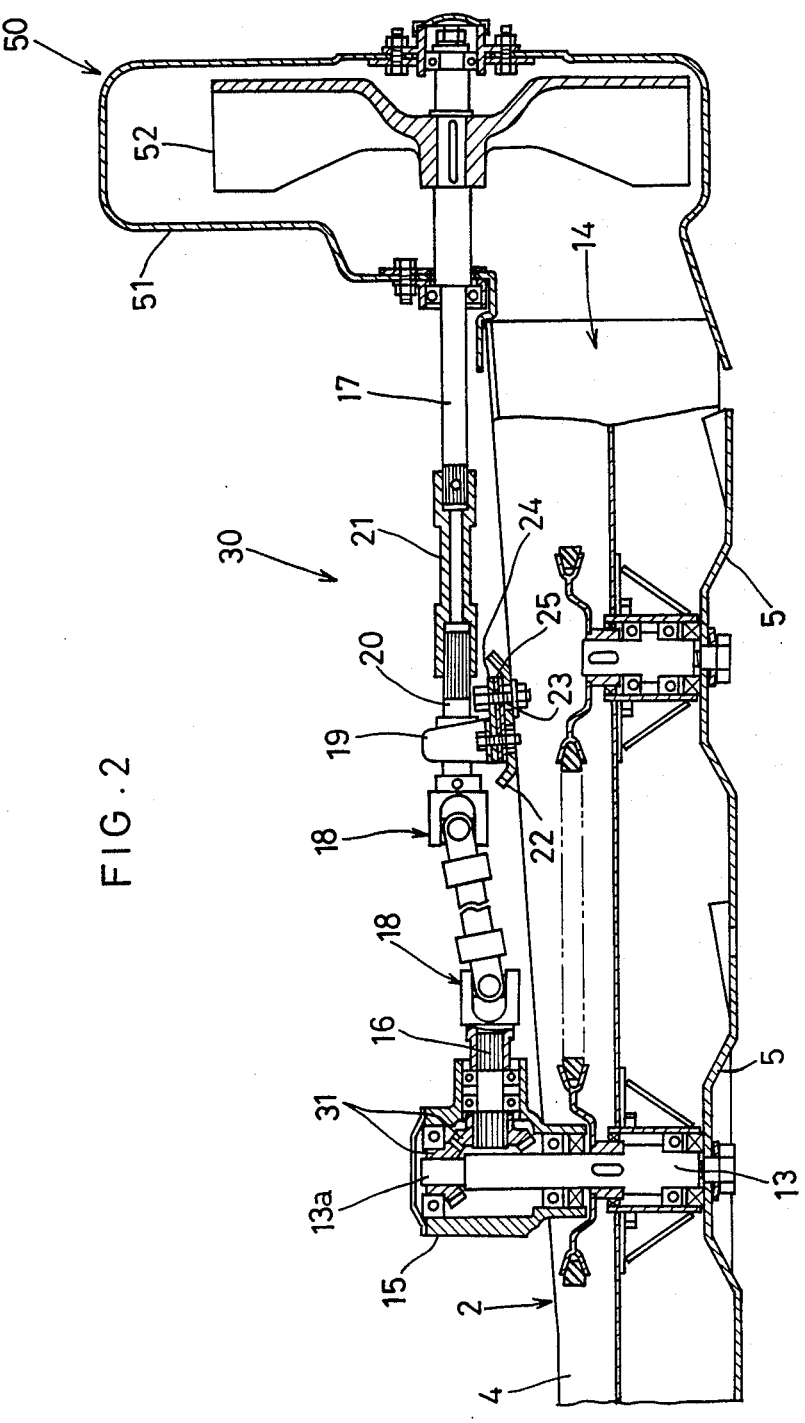
FIG. 2 is a sectional rear view of a grass cutting unit and a blower unit.

As also shown in FIG. 2, the mower unit 2 includes a discharge opening 14 at one lateral side thereof, to which a blower unit 50 is removably attached for transmitting grass clippings as entrained on air flows through a duct 12 to the grass catcher 3. The blower unit 50 includes a blower case 51 and a rotary blade 52 mounted therein. The blower unit 50 is driven by the following mechanism.

Engine output is transmitted through an intermediate shaft 13A to a vertical drive shaft 13 supported by the mower housing 4 for driving the rotary blades 5. The drive shaft 13 extends into an input bevel gear case 15 mounted on a transversely mid-position of the top surface of the housing 4. The bevel gear case 15 further includes an output shaft 16 acting as a PTO shaft and extending toward the blower unit 50. The blower unit 50 includes an input shaft 17 acting as a blower shaft and extending toward the bevel gear case 15. These output shaft 16 and input shaft 17 are operatively interconnected through a shaft transmission device 30 including two universal joints 10. The output shaft 16 is driven by the drive shaft 13 through a bevel gear pair 31.

Figure 3:
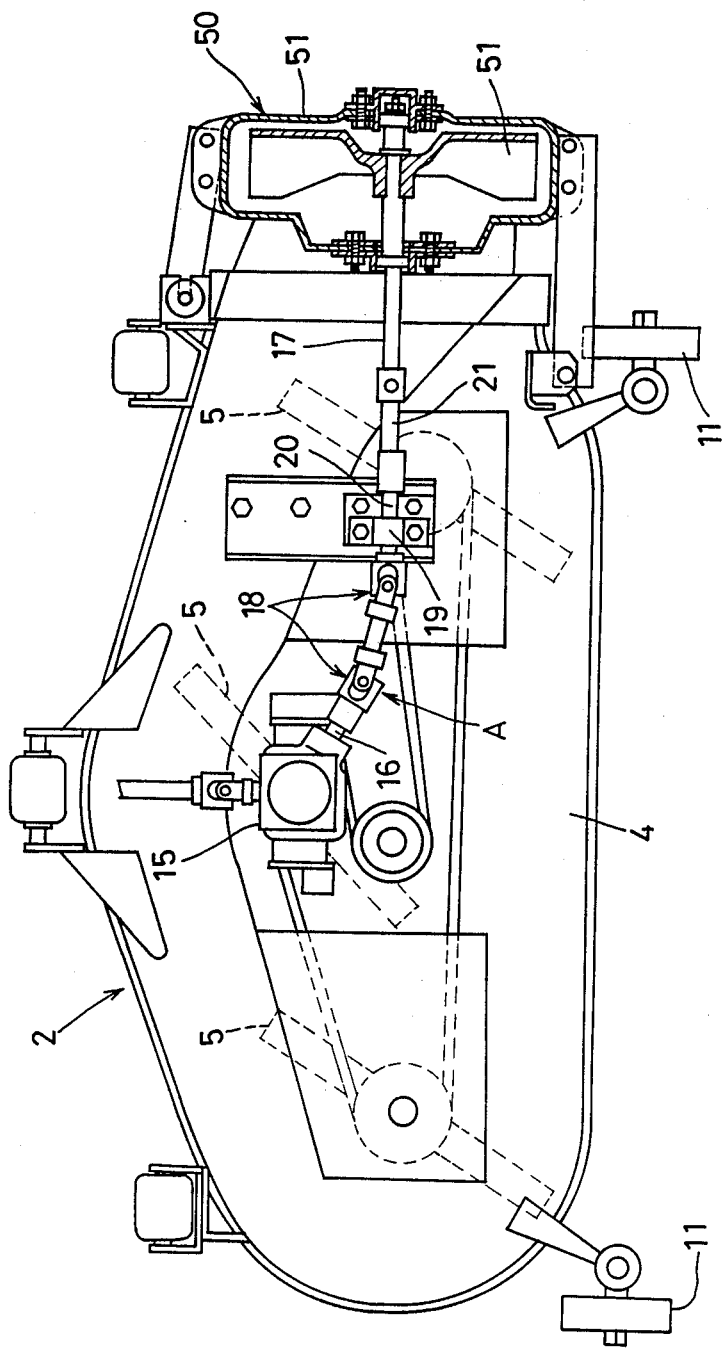
FIG. 3 is a plan view, partly in section, of the grass cutting unit and blower unit.

Referring to FIGS. 2 and 3, the shaft transmission device 30 includes, besides the universal joints 18, a plummer block 19 having an aligning function, an intermediate shaft 20 supported by the plummer block 19, and a coupling 21. This transmission device 30 operatively interconnects the output shaft 16 extending laterally and rearwardly from the bevel gear case 15 which drives a central rotary blade 5, and the input shaft 17 which drives the rotary blade 51 of the blower unit 50.

Figure 4:
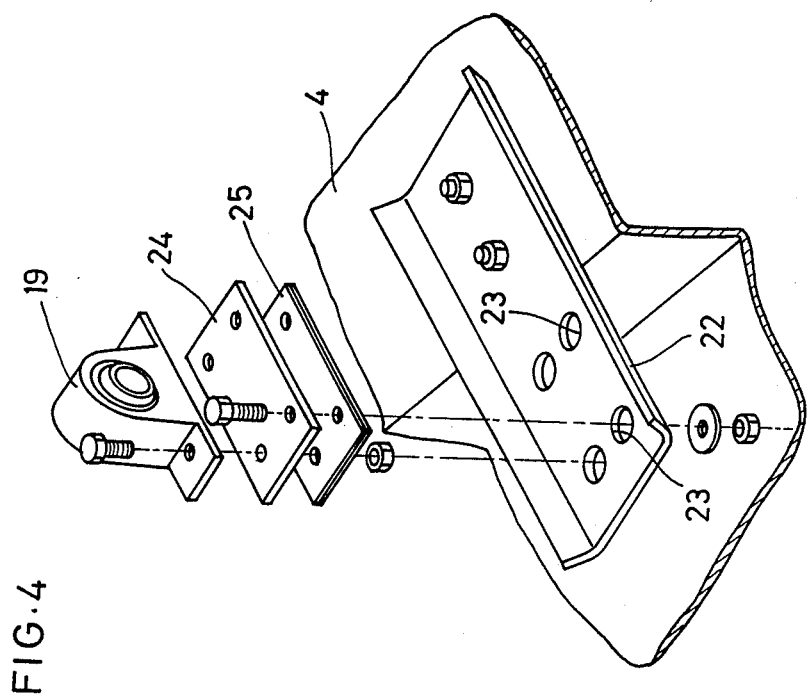
FIG. 4 is an exploded perspective view showing how a plummer block is mounted.

As shown in FIG. 4, the plummer block 19 is secured to a support plate 24 bolted by means of large bores 23 to a mounting plate 22 having bent opposite sides and bolted to the top surface of the housing 4. A shim 25 is mounted between the mounting plate 22 and support plate 24. The shim 25 and large bores 23 allow the plummer block 19, and thus the intermediate shaft 20, to be positionally adjusted back and forth, right and left, and up and down. This construction is capable of absorbing a slight disalignment between the intermediate shaft 20 and input shaft 17 which may occur with attachment and detachment of the blower unit 50 to/from the mower unit 2.

The connection between the output shaft 16 and one of the universal joints 18 and the connection between the intermediate shaft and input shaft 17 are in the form of spline engagement.

The configuration of the blower case 51 will be described next with reference to FIGS. 5 and 6. The blower case 51 contains the rotary blade 52 mounted on a blower shaft 58 rotatable on a horizontal axis P1. The blower case 51 includes a connecting case portion 53 extending sideways for connection to the discharge opening 14 provided laterally of the mower unit 2 Further, the blower case 51 defines an outlet 54 at an upper position thereof, which is connected to the duct 12 for transmitting grass clippings to the grass catcher 3.

More particularly, the blower case 51 is formed of an inner lateral wall 55 defining the connecting case portion 53 for connection to the discharge opening 14 of the mower unit 2, an outer lateral wall 56, and a peripheral wall 57 connected to the inner and outer lateral walls 55 and 56 and extending circumferentially of the rotary blade 52. The blower shaft 58 has an extension 59 thereof penetrating the inner lateral wall 55.

The inner lateral wall 55 includes a bulging portion 60 bulging arcuately about the axis P1 of the blower shaft 58 and communicating with the connecting case portion 53. The bulging portion 60 includes a drive input section 63 for driving the rotary blade 52.

Figure 6:
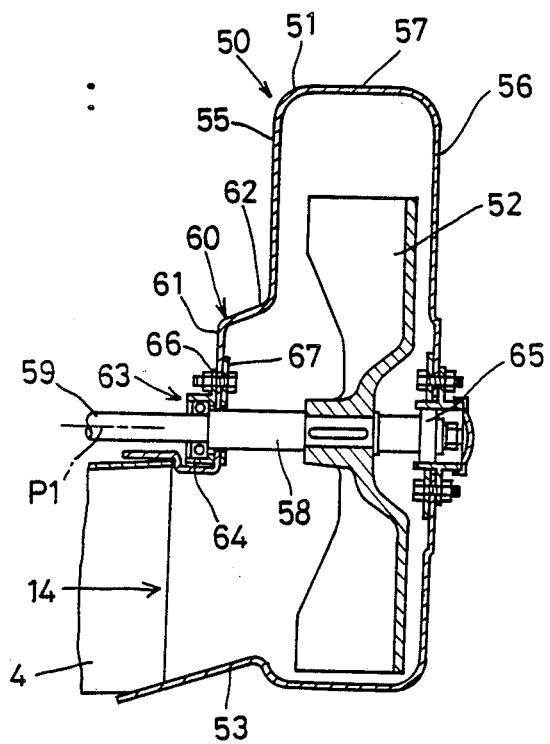
FIG. 6 is a sectional rear view of the blower unit.

As shown in FIG. 6, the input section 63 includes a shaft supporting device 64 mounted outside a vertical side surface 61 of the bulging portion 60 opposed to the mower unit 2. The rotary blade 52 is supported by the shaft supporting device 64 and a shaft supporting device 65 mounted on the outer lateral wall 56.

The shaft supporting device 64 includes a flanged plate 66 containing a bearing. The input section 63 inside face of the inner lateral wall 55 and opposed to the flanged plate 66 across the lateral wall 55. The flanged plate 66, lateral wall 55 and mounting plate 67 are bolted together.

The extension 59 of the blower shaft 58 projecting from the bulging portion 60 is connected to the shaft transmission device 30.

Figure 5:
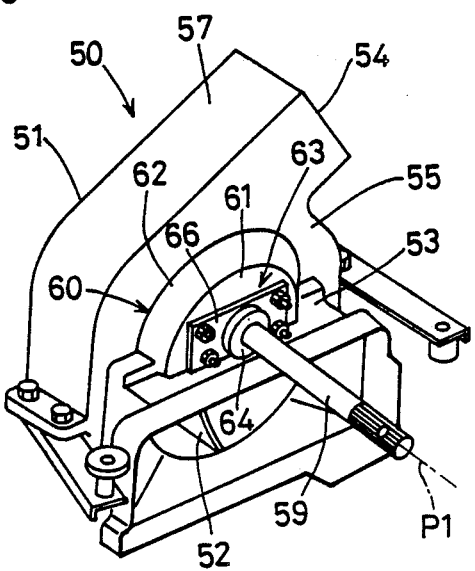
FIG. 5 is a perspective view of the blower unit.

As shown in FIG. 5, the bulging portion 60 includes an inclined peripheral surface 62 diverging from the vertical side surface 61 toward the rotary blade 52 for enhancing smooth flow of the grass clippings.

How the blower unit 50 is connected to the mower housing 4 will particularly be described next with reference to FIGS. 7 through 9.

Figure 7:
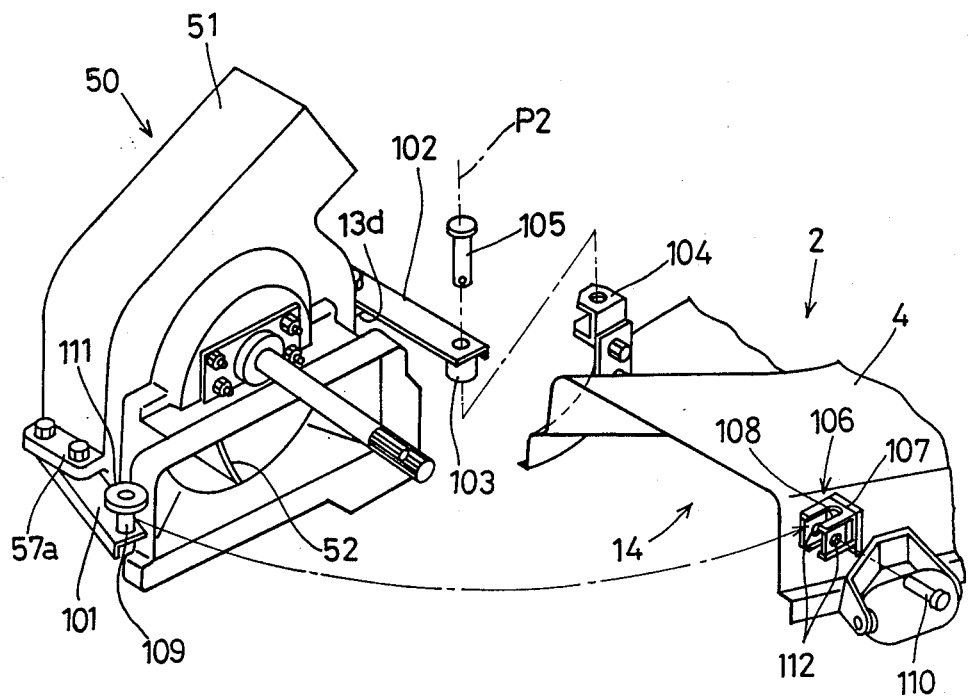
FIG. 7 is a perspective view of the blower unit prior to attachment.

As shown in FIG. 7, the peripheral wall 57 of the blower case 51 carries attachment members 101 and 102 extending from front and rear faces thereof toward the mower unit 2. The rear attachment member 102 is pivotally connected to a rear support 104 provided on the mower housing 4 through a pin 105 having a vertical axis P2. The front attachment member 101 includes an engaging element 109 at a projecting end thereof which is sideways movable, with pivotal movement on the vertical axis P2 of the blower unit 50, into and out of a recess 108 of a front support 107 provided on the mower housing 4. With the engaging element 109 lying in the recess 108, the front attachment member 101 and rear support 107 are connected by a retainer pin 110 to prevent the front attachment member 101 from pulling out of the recess 108 with the pivotal movement on the vertical axis of the blower unit 50.

The front attachment member 101 further includes a plate with a front end thereof bent downward to have an L-shaped section, which plate is bolted to a projection 57a formed on the front surface of the peripheral wall 57 of the blower case 51. The engaging element 109 comprises a bar shaped piece securely erected on a projecting end of the plate and having a washer 111 fixed to the top of the bar-shaped piece.

Figure 8:
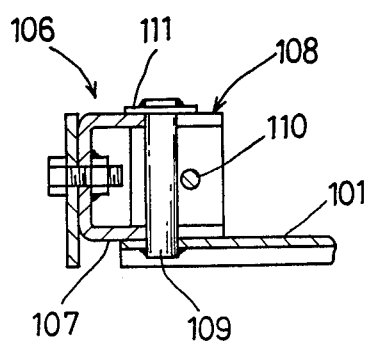
FIG. 8 is a sectional view of a front connection.

As shown in FIG. 8, the front support 106 includes a plate member 101 bolted to a bracket projecting from the mower housing 4. The support member 101 is channel shaped in front view, with upper and lower surfaces rigidly interconnected at front and rear positions by reinforcing plates. The upper and lower surfaces are cut out to define the recess 108 opening horizontally. The front and rear reinforcing plates define pin receiving bores 112.

Figure 9:
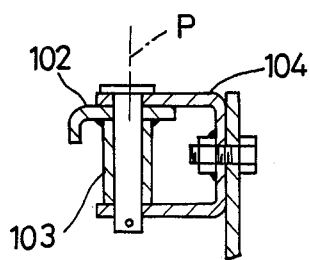
FIG. 9 is a sectional view of a rear connection.

As shown in FIG. 9, the attachment member 102 includes a plate with a rear end thereof bent downward to have an L-shaped section, which plate is bolted to a projection 57b formed on the rear surface of the peripheral wall 57 of the blower case 51. This plate carries a boss 103 secured to and depending from an end of the plate opposed to the mower unit 2.

The rear support 104 includes a plate member bolted to a bracket erected on the mower housing 4. This plate member is channel shaped in side view, with upper and lower surfaces defining bores.

To connect the blower unit 50 to the mower unit 2, the boss 103 of the rear attachment member 102 is first fitted between the upper and lower surfaces of the rear support 104. Then the pin 105 is placed to extend through the upper and lower surfaces and boss 103 to make the pivotal connection.

Next, the blower unit 50 is caused to pivot on the vertical axis P2 of the pin 105 to move the engaging element 109 of the front attachment member 101 into engagement with the recess 100 of front support 18. In this position the front support 106 is sandwiched between the washer 111 and the projecting end of the L-shaped plate of the front attachment member 101. Then the retainer pin 110 is placed to extend through bores 112 defined in the front and rear enforcing plates to hold the engaging element 109 in position. This completes the operation for connecting the blower unit 50 to the mower housing 4.

We claim:

1. A lawn mower comprising;
   a mower unit including a mower housing defining a grass clipping side discharge opening, and at least one cutting blade rotatable on a substantially vertical drive shaft inside said mower housing,
   a blower unit mounted laterally of said mower housing, said blower unit including a blower case defining a chamber communicating with said side discharge opening, a blower shaft extending substantially horizontally in said blower case, a blower shaft extension extending through said blower case toward said mower housing, and a blower fan mounted on said blower shaft, and
   shaft transmission means connected at one end thereof to said blower shaft extension and extending substantially horizontally above said mower housing, said shaft transmission means including a PTO shaft for receiving power from said drive shaft through bevel gear means.

2. A lawn mower as claimed in claim 1, wherein said shaft transmission means further includes universal joint means for aligning said PTO shaft and said blower shaft.

3. A lawn mower as claimed in claim 2, wherein said shaft transmission means further includes an intermediate shaft and bearing means for supporting said intermediate shaft, said bearing means being secured to said mower housing to be adjustable in three dimensional directions.

4. A lawn mower as claimed in claim 1, wherein said mower case is formed of an inner lateral wall defining a connecting opening for communication with said discharge opening of said mower unit, an outer lateral wall, and a peripheral wall connected to said inner and outer lateral walls and extending circumferentially of said blower fan, said inner lateral wall including a bulging portion bulging in a truncated cone shape about an axis of said blower shaft extension.

5. A lawn mower comprising;
   a mower housing supporting a cutting blade for rotation on a substantially vertical drive shaft,
   a grass clipping discharge opening defined laterally of said mower housing,
   a blower unit including a blower case for communication with said discharge opening,
   a first attachment member disposed at a front end of said blower case and extending toward said mower housing,
   a second attachment member disposed at a rear end of said blower case and extending toward said mower housing,
   a second support member connected to said blower unit through said second attachment member for allowing said blower unit to pivot on a vertical axis, said second support member being provided on said mower housing,
   a first support member provided on a position of said mower housing opposed to said first attachment member when said blower unit is caused to pivot on said vertical axis for connection to said mower housing and
   engaging means for connecting said first attachment member to said first support member, said engaging means including;
   a recess opening laterally,
   an engaging element for laterally fitting into said recess when said blower unit is caused to pivot on said vertical axis for connection to said mower housing, and
   lock means for locking said recess and said engaging element in an engaged position.

6. A lawn mower as claimed in claim 5, wherein said blower unit includes a blower shaft extending substantially horizontally and connected to said blade drive shaft through shaft transmission means mounted on said mower housing, said shaft transmission means including an engageable and disengageable shaft joint.

7. A system for cutting grass and collecting grass clippings comprising;
   a tractor having an internal combustion engine,
   a rotary lawn mower having a generally horizontal housing mounted on the tractor,
   said mower housing having a grass clipping side discharge section having a discharge opening,
   at least one grass cutting blade located in said housing,
   means including an upright blade shaft rotatably mounting the blade on the housing,
   drive means for transmitting power from the tractor engine to the blade shaft to rotate the blade whereby the blade cuts grass under said housing and moves grass clippings through said discharge opening,
   grass clippings collector means mounted on the tractor,
   blower means for receiving the grass clippings from said discharge opening and moving the grass clippings to the collector means,
   said blower means having a housing with an internal chamber and an inlet opening aligned with the discharge opening,
   fan means located within said chamber,
   a horizontal shaft rotatably mounting the fan means on the housing for rotation about a generally horizontal axis, and
   shaft transmission means for drivably connecting the horizontal shaft with one upright blade shaft whereby power is transmitted from said one upright blade shaft to the fan means to rotate the horizontal shaft,
   said housing having a hole above one blade shaft, said shaft transmission means including;
  an upright shaft extension extended through said hole and secured to said one blade shaft,
  a PTO shaft extending substantially horizontally above said mower housing,
  bevel gear means for drivably connecting said extension to said PTO shaft, and
  universal joint means for aligning a horizontal shaft and said PTO shaft,
  whereby power is transmitted from said extension to said horizontal shaft only through the shaft.

* * * * *